UNITED STATES PATENT OFFICE 2,277,745

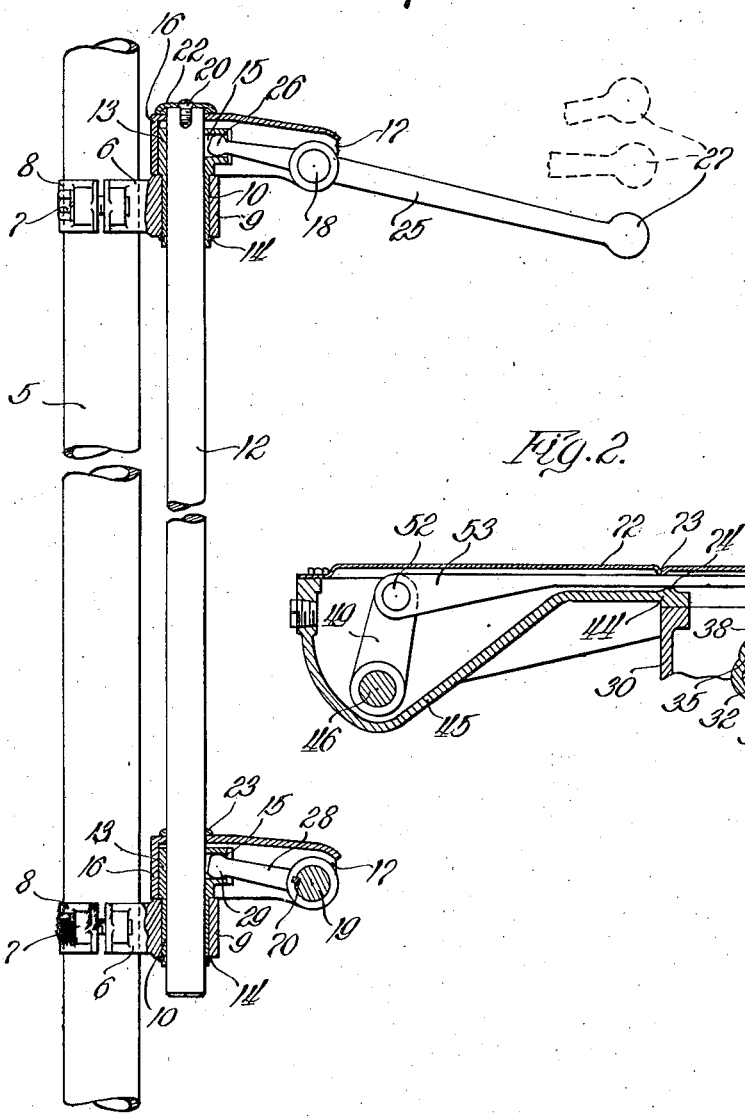

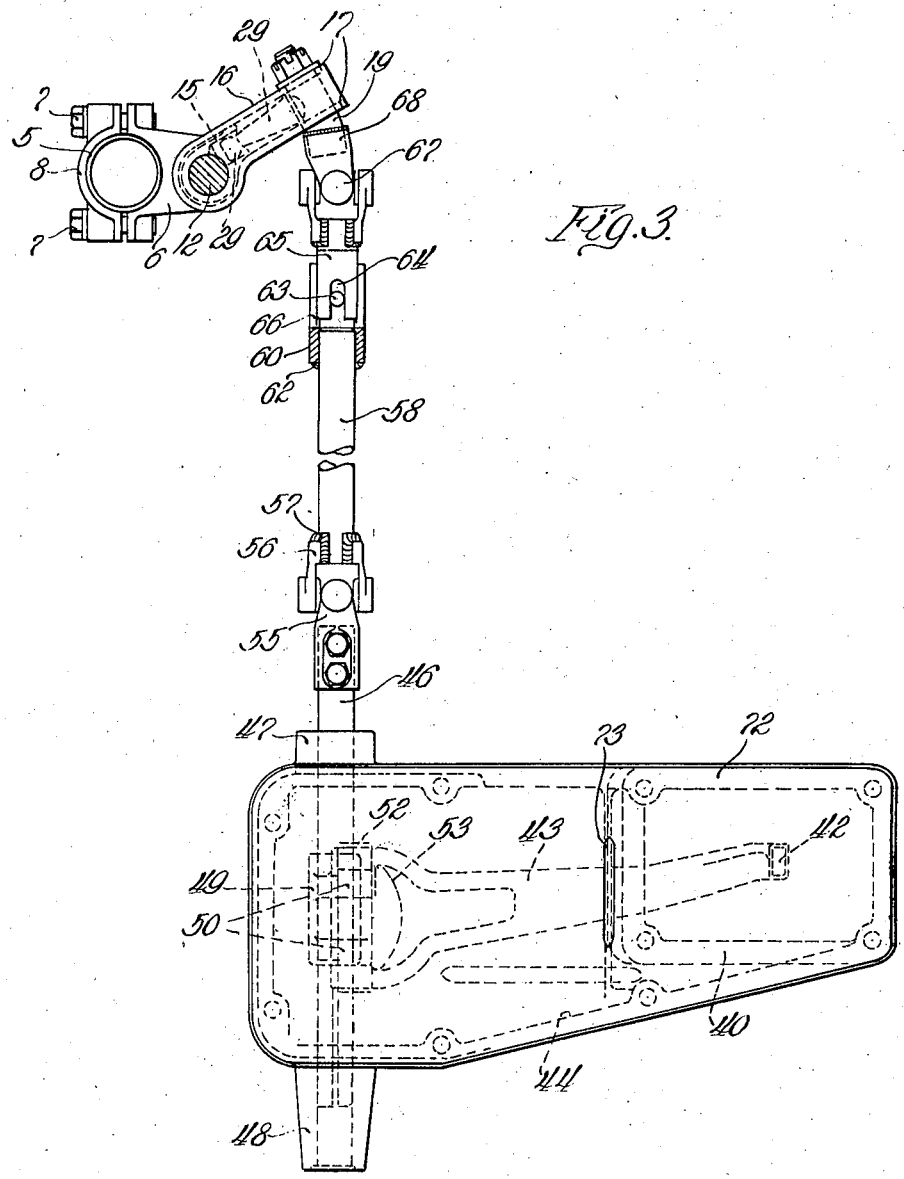

GEARSHIFT CONTROL

Donald S. Dence, Ernest E. Eaton, and Robert Lapsley, Berrien Springs, Mich., assignors to Clark Equipment Company, Buchanan, Mich., a corporation of Michigan Application November 30, 1940, Serial No. 367,942

12 Claims. (Cl. 74—484)

The present invention is concerned primarily with the provision of a remotely disposed mechanism for controlling the selection and shifting of gears at a transmission, and in its broader aspects, contemplates the provision of a control mechanism mounted on the steering column of a vehicle and arranged for control of a remotely disposed transmission such as a cap-over-engine type truck, a rear engine drive vehicle, or any vehicle in which the transmission is disposed in such position that it is desired to eliminate the transmission tower and transmission level and employ in lieu thereof a remote control mechanism.

One of the primary objects of the present invention is to provide such a gear shift control mechanism in which a single operating rod is employed for providing both the selection and shifting of gears at the transmission, and is adapted to actuate a single motion transmitting means extending between the transmission and the remote control mechanism.

Another important object of the present invention is to provide a mechanism in which the transmission is provided with a single projecting operating shaft which is arranged for both rotation and axial shifting movement to provide for the desired selection and shifting of gears within the transmission.

Still another object attained by the present invention and of distinct advantage is the provision of a mounting for the control means wherein identical brackets can be employed for supporting the control rod and identical arms are secured to the rod, one of which is adapted to mount the manually operable selecting lever and other of which carries the mechanism by which motion is transmitted to the operating shaft of the transmission. This provides a standardized construction composed of relatively few parts capable of mass production, and providing a very cheap and economical control mechanism.

Still another object of the present invention is to provide means at the bottom of the control rod which will transmit rotational movement of the rod into longitudinal shifting movement, and will transmit axial movement of the rod into rotative movement.

Still another feature of the present invention is the provision of a control means so arranged that the standard type of shift can be employed, thereby necessitating no instruction to the operator and thus rendering the mechanism adaptable for use on existing vehicles without any change in the mode of operation.

Other objects and advantages of the present invention will be more apparent from the following detailed description which, taken in conjunction with the accompanying drawings, will disclose to those skilled in the art the particular construction and operation of the preferred form of the present invention.

In the drawings:

Figure 1 is a sectional view through the control rod and its constituent actuating mechanisms mounted on the steering column;

Figure 2 is a sectional view through the transmission control mechanism for selecting and shifting the gears in the transmission; and Figure 3 is a top plan view partly diagrammatic of the gear shift control mechanism.

Referring now in detail to the drawings, in Figure 1 we have disclosed the steering column indicated generally at 5, which has mounted thereon immediately below the steering wheel the bracket member 6, which member is provided with oppositely directed ears adapted to receive studs 7 carried by an arcuate cap member 8. The bracket member 6 has a semi-cylindrical recess therein, as has the cap member 8 which fits about the surface of the steering column and provides for a rigid mounting of the bracket thereon. A corresponding bracket and cap member are provided adjacent the lower end of the steering column, these parts being identical in structure.

Each of the brackets 6 is provided with a collar portion 9 having a transverse bore therethrough adapted to receive a bushing 10, which bushing forms a journal for the operating or control rod 12. The bushing 10 in each of the brackets 6 is provided with an enlarged head portion 13 forming a shoulder holding the bushing against movement through the collar portion 9 in one direction. Movement of the bushing in the opposite direction is prevented by means of a snap ring 14 carried by the projecting end of the bushing.

The head portions 13 of each of the bushings are provided with laterally directed arcuate outwardly opening channels 15, which channels form a fulcrum means for the actuating and motion transmitting lever to be described hereinafter. The operating rod 12 extends through axial bores in each of the bushings 10, and is arranged for both rotative and axial shifting movement relative thereto. At the upper end of the rod 12 there is provided an arm 16, which arm is of general channel shape having an end portion closely fitting about the head portion 13 of the bushing, and having the webs thereof terminating adjacent their outer ends in journal portions 17 for receiving the pivot pin or shaft 18. A corresponding arm 16 is provided at the lower end of the operating rod 12 embracing the head portion 13 of the lower bushing 10, and also having a journal portion for the pivot shaft 19 extending between the side flanges. The upper end of the rod 12 is tapped to receive the screw 20 which holds a suitable closure cap member 22 in position over the arm. The arm is preferably either welded or similarly non-rotatably secured to the operating rod 12, and the lower arm 16 is also non-rotatably secured to the rod 12 as by means of the welding 23.

Mounted on the journal pin 18 of the upper arm 16 is a gear shift lever 25 which is pivoted intermediate its ends on the pin 18 and has one end thereof indicated at 26 fulcrumed in the channel 15 of the upper bushing. The opposite end of the lever 25 is provided with a ball tip 27 in a conventional manner. The dotted lines shown in Figure 1 indicate various positions which the lever 25 may take by rocking the same about the pivot 18. It will be apparent that upward movement of the end 27 of the lever will result in fulcruming the lever in the channel 15 and imparting a raising force to the pin 18, producing axial upward shifting of the control rod 12. This in turn raises the lower arm 16 secured to the rod 12, and produces a corresponding pivotal movement of the lever 28 mounted on the pivot 19 and having its end 29 fulcrumed in the channel 15 of the lower bushing. Thus, pivotal movement of the lever 25 about the pin 18 will produce a corresponding pivotal movement of the lever 28 at the lower end of the rod by the axial shifting of the control rod 12. The lever 25 may also be rotated in any one of its vertical shifted positions in a plane transverse to the axis of the control rod 12. This produces corresponding rotation of the control rod 12 which in turn rotates the arm 16, and consequently swings the lever 28 bodily about the end 29 as a center. Thus, arcuate movement of the lever 25 with respect to the shaft or rod 12 will produce corresponding arcuate movement of the lever 28 at the lower end of the rod.

A remotely disposed transmission housing is indicated generally at 30, and has mounted in the upper portion thereof the shift rails 32, 33 and 34. Each of these rails is provided with a shift lug 35, 36 and 37, respectively, having notched portions 38, 39 and 40 adapted to be engaged by the end 42 of a transverse arm member 43. The arm 43 is mounted in a top member 44 secured over the top of the transmission housing 30, and having an enlarged portion 45 through which extends the operating shaft 46, this shaft being suitably journalled in the bosses 47 and 48 shown in Figure 3 of the housing member 44. This provides for both rotation and axial shifting of the shaft 46. Secured to the shaft within the housing 45 is an arm member 49 which has spaced journals 50 at its upper end carrying a transverse pin 52 for pivotally mounting the bifurcated end 53 of the arm 43 thereon. The spacing of the journals 50 provides for imparting lateral rigidity to the arm 43, whereby longitudinal movement of the shaft 46 will move the arm 43 laterally to produce corresponding axial shifting of the selected shift rail within the transmission. Rotational movement of the shaft 46 rotates the arm 49, thereby moving the transverse arm 43 transversely to provide the desired selection of the shift rail inasmuch as the end 42 of this arm is thereby moved relative the forks 38, 39 and 40 into the desired position.

The projecting end of the shaft 46 is provided with a coupling member 55 which is universally connected to the coupling member 46 welded as at 57 to a motion transmitting rod 58. This provides a universal joint connection between the rod 58 and the shaft 46. The opposite end of the rod 58 is provided with a sleeve member 60 welded thereon, as indicated at 62. The sleeve member is adapted to carry a transverse pin 63 having sliding engagement within the slotted portion 64 of an arm member 65. The arm member 65 is also non-rotatably locked to the slotted end 66 of the sleeve 60, whereby rotational movement of the arm 55 produces corresponding rotational movement of the shaft 58.

The opposite end of the arm 65 has a universal joint connection, as indicated at 67, to a yoke member 68 carried upon the pin 19 fulcrumed in the journal portions 17 of the lower arm 16 carried on the operating rod 12. It will therefore be apparent that arcuate movement of the arm 16 about the control rod 12 results in a longitudinal movement of the pin 19, which, through the joint 67, motion transmitting rod 58 and joint 55 produces axial shifting movement of the operating shaft 46.

Vertical shifting movement of the control rod 12 produces rotation of lever 28, which is keyed as at 70 to the pin 19, thereby rotating the pin 19 and through the joint 67, pin 63, rod 58, and coupling 55 rotates the shaft 46 for moving the arm 43 into engagement with the selecting shift rail.

Thus vertical raising movement of the end 27 of the shift lever 25 will result in a corresponding rotational movement of the pin 19 at the lower end of the control rod 12 which, through the mechanism previously described, will rotate the shaft 46 to produce the desired selection of the shift rail within the transmission. Subsequent swinging movement of the arm 25 about the end 26 in a plane transverse to the rod 12 will rotate the rod 12, moving the pin 19 at the lower end thereof in an arcuate path about the rod as a center. This results in longitudinal movement of the motion transmitting rod 58. This in turn produces longitudinal shifting of the shaft 46 moving the arm 43 laterally to shift the corresponding rail within the transmission axially for moving the selected gear into meshing engagement. The housing 44 is provided with a cover plate 72 of very thin stock, such as a stamping which is provided with a transverse bead 73 bearing against the upper surface of the lever 43. Similarly the housing 44 has a transverse rib 74, thereby confining the lever 43 against vertical rattling and maintaining its path of movement accurately defined to provide the desired selecting movement as the shaft 46 is rotated.

It will therefore be apparent that with the present construction a very economical structure is provided due to the duplication of various of the parts in the steering column mounted control, and also in the provision of only one motion transmitting rod between the control and the transmission.

We are aware that various changes may be made in certain details of the construction without in any way affecting the underlying principles thereof, and we therefore do not intend to be limited except as defined by the scope and spirit of the appended claims.

We claim:

1. The combination, with the steering column of a vehicle, of a pair of identical brackets spaced longitudinally thereon and having alined collar portions, a bushing mounted in each collar portion and having a head portion provided with a laterally opening channel, a shaft extending through said bushings and rotatably supported therein, a laterally extending arm secured to said shaft around each head portion and terminating in a pivot portion, a lever pivoted in each of said pivot portions and having one end engageable in said channels of said bushings, one of said levers being manually operable to rotate said shaft in said bushing upon bodily swinging movement thereof and to move said shaft axially upon pivotal movement thereof whereby the other lever is correspondingly actuated, and means connected to said other lever and operable thereby for selecting and shifting gears in a remotely disposed transmission.

2. In combination, a transmission, means including a shaft projecting from said transmission for selecting and shifting gears therein, a remotely disposed steering column, brackets thereon including bushings having laterally offset head portions, a rod mounted for rotation and axial shifting in said bushings, said rod having laterally extending arms adjacent each of said brackets, levers pivotally mounted on said arms adjacent said brackets and having one end thereof fulcrumed in said head portions, one of said levers being manually operable to rotate and axially shift said rod, the other lever being correspondingly actuated by said rod, and means connected between said other lever and said shaft for rotating and axially shifting said shaft to select and shift gears in said transmission.

3. In combination, an operating rod, longitudinally spaced brackets supporting said rod for rotation and axial shifting movements, bushings in said brackets having laterally offset head portions, a laterally extending arm secured to said rod adjacent each bracket, a first lever pivotally mounted intermediate its ends on the end of one of said arms and having one end fulcrumed in the adjacent head portion whereby bodily arcuate movement of said lever rotates said rod and pivotal movement of said lever axially shifts said rod, a second lever pivotally carried by the end of the other arm and having one end fulcrumed in the adjacent head portion, and a motion transmitting shaft having jointed connection to the pivot of said second lever whereby said shaft is rotated upon pivotal movement of said second lever caused by axial shifting of said rod, and is axially shifted upon rotation of said rod.

4. The combination, with a steering column of a vehicle, of identical brackets spaced longitudinally on said column, bushings journalled in said brackets and having offset head portions, a rod supported for rotation and axial shifting in said bushings, a laterally extending arm secured to said rod above each bracket and terminating in a transverse pivot journal, a gear shift lever pivotally mounted intermediate its ends in the upper arm and having one end fulcrumed in the associated head portion of the bushing whereby raising and lowering of the opposite end of said lever shifts said rod axially, and swinging of said lever in a plane transverse to said rod rotates the rod, a second lever pivoted in the lower arm and fulcrumed at one end on said head portion of the bushing, a universal joint connected to the second lever pivot, and motion transmitting means connected to said joint whereby axial shifting of said rod rotates said second lever for rotating said means and rotation of said rod swings said lever for axially shifting said means.

5. The combination, in a remote control gear selecting and shifting means for a transmission, of a pair of identical spaced brackets having bushings journalled therein, a rod supported for rotation in said bushings and axially shiftable therein, a first arm carried at one end of said rod enclosing the upper end of one bushing and terminating laterally in a transverse pivot journal, a second identical arm enclosing the upper end of the other bushing, a first lever pivoted intermediate its ends in said first arm and fulcrumed at one end in the enclosed portion of said one bushing, and a second lever pivoted at one end in the second arm and fulcrumed at its opposite end in the enclosed portion of said other bushing, said second lever having an axial pivot extension connected to motion transmitting means extending to said transmission.

6. In a steering column mounted gear selecting and shifting means for a remotely disposed transmission, the combination of a pair of identical brackets spaced longitudinally on said column and including bushings having offset portions, a rod mounted for rotation and axial shifting movement in said portions, a laterally extending arm on said rod adjacent each bracket, lever means pivotally mounted in each arm and fulcrumed at one end on the offset portions of said bushings, one of said lever means being manually operable and the other having a motion transmitting rod connected thereto and extending to said transmission.

7. The combination of claim 6 further characterized in that each of said offset portions of said bushings has a laterally opening arcuate channel forming the fulcrum means for said lever means.

8. In combination, a shift rod, a bracket for supporting said shift rod comprising a portion adapted to be clamped to the steering column of a vehicle and having a projecting collar portion, a bushing mounted against axial movement in said collar portion and having a straight bore receiving said rod, said bushing having an enlarged head portion above said bracket portion provided with a laterally directed arcuate channel, a laterally directed arm secured to said rod about said bushing, a lever pivoted intermediate its ends on said arm, and a fulcrum on one end of said lever engaging in said channel.

9. Steering column mounted control means for a remotely disposed transmission comprising an operating rod, identical spaced bracket means including bushings supporting said rod on said column for rotation and axially shifting movement, identical laterally extending arms secured to said rod adjacent each of said bracket means, said bushings having laterally directed head portions, said arms terminating in transverse pivot journals, and lever means pivotally mounted in each journal and having an end thereof fulcrumed in the adjacent head portion, whereby pivotal movement and acuate swinging of one lever means is transferred into corresponding movement of the other lever means through said rod and bracket means.

10. The control means of claim 9 further characterized in that each of said head portions has an arcuate laterally directed channel forming the fulcrum for said end of said lever means regardless of the arcuate position of the lever means.

11. The control means of claim 9 wherein said other lever means has a projecting pivot extension movable conjointly therewith for transferring movement of said lever means to a motion transmitting member connected to said transmission.

12. In combination, a transmission having a plurality of parallel shift rails, a flat arm member movable transversely for selective engagement with said rails, a shaft laterally offset from and paralleling said rails, an arm secured to said shaft, a pivot pin carried by the oppostie end of said arm, spaced ears on said flat arm pivotally mounted on said pin whereby rotation of said shaft shifts said flat arm transversely for selection of said rails, said spacing of said ears providing lateral rigidity in said flat arm whereby axial shifting of said shaft shifts said flat arm laterally.

DONALD S. DENCE.
ERNEST E. EATON.
ROBERT LAPSLEY.